United States Patent
Van Lerberghe

[19]

[11] Patent Number: 5,952,814
[45] Date of Patent: Sep. 14, 1999

[54] INDUCTION CHARGING APPARATUS AND AN ELECTRONIC DEVICE

[75] Inventor: Steven J. W. Van Lerberghe, Eindhoven, Netherlands

[73] Assignee: U.S. Philips Corporation, New York, N.Y.

[21] Appl. No.: 08/970,884

[22] Filed: Nov. 14, 1997

[30] Foreign Application Priority Data

Nov. 20, 1996 [EP] European Pat. Off. .............. 96402496

[51] Int. Cl.⁶ ....................................................... H02J 7/00
[52] U.S. Cl. ................... 320/108; 320/115; 320/DIG. 21
[58] Field of Search .................... 320/107, 112, 320/113, 106, DIG. 12, 108, 115

[56] References Cited

U.S. PATENT DOCUMENTS

| | | | |
|---|---|---|---|
| 5,122,729 | 6/1992 | Itoga et al. ................................. | 323/347 |
| 5,159,256 | 10/1992 | Mattinger et al. ........................ | 320/115 |
| 5,734,254 | 3/1998 | Stephens .................................. | 320/106 |

FOREIGN PATENT DOCUMENTS

| | | | |
|---|---|---|---|
| 0419806A2 | 4/1991 | European Pat. Off. ........... | H02J 7/00 |
| 0533247A1 | 3/1993 | European Pat. Off. ........... | H02J 7/02 |
| 0642203A1 | 8/1995 | European Pat. Off. ........... | H02J 7/00 |
| 4100272A1 | 7/1991 | Germany ........................... | G05F 1/66 |
| WO9608068 | 3/1996 | WIPO ................................ | H02J 7/00 |

*Primary Examiner*—Peter S. Wong
*Assistant Examiner*—Gregory J. Toatley

[57] ABSTRACT

Known is an induction charging apparatus for charging battery means in an electronic device when inductively coupled to the charging apparatus, the charging apparatus comprising a first casing having a charging receptacle for receiving the electronic device and an alternating current power source coupled to a primary coil provided in the first casing, and the electronic device comprising a second casing provided with a secondary coil electronically coupled to the battery means, whereby the primary and the secondary coil are magnetically coupled for inductively conveying energy from the primary coil to the secondary coil when the electronic device is put in the receptacle. So as to prevent heating metallic objects that might enter the receptacle when the phone is not being charged but used, the induction charging apparatus comprises electric power blocking means for blocking power to be conveyed from the alternating current power source to the primary coil when the electronic device is absent from the charging receptacle, and the electronic device comprising unblocking means for unblocking the power to be conveyed, whereby the blocking and unblocking means are paired. Herewith, a cheap and reliable means for preventing such undesired heating are provided.

5 Claims, 2 Drawing Sheets

INDUCTION CHARGING APPARATUS AND AN ELECTRONIC DEVICE

BACKGROUND OF THE INVENTION

1. Field of the invention

The present invention relates to an induction charging apparatus for charging battery means in an electronic device when inductively coupled to the charging apparatus, the charging apparatus comprising a first casing having a charging receptacle for receiving the electronic device and an alternating current power source coupled to a primary coil provided in the first casing, and the electronic device comprising a second casing provided with a secondary coil electronically coupled to the battery means, whereby the primary and the secondary coil are magnetically coupled for inductively conveying energy from the primary coil to the secondary coil when the electronic device is put in the receptacle The present invention further relates to an electronic device having battery means to be charged by means of the induction charging apparatus. Such an electronic device can be a cordless or a cellular telephone, or any other electronic device powered by means of batteries.

2. Description of the related art

An induction charging apparatus and an electronic device of this kind are known from the European patent application EP 0 642 203 A1. In this European patent application an induction charging apparatus is described having a depressible member movably provided and closing an open end of a casing of the charging apparatus forming a charging receptacle for an electronic device when batteries in the electronic device are to be charged by means of the charging device. Charging is done by inductively conveying energy from a primary coil comprised in the charging apparatus to a secondary coil comprised in the electronic device and rectifying an alternating current so generated in the secondary coil. When the electronic device is absent from the charging receptacle, the depressible member is in a raised position in which magnetic fluxes generated in the primary coil are substantially located under the depressible member. When the electronic device is present in the charging receptacle, the depressible member is in a depressed position, the generated magnetic fluxes are substantially located over the depressible member so that substantial energy can be conveyed from the primary to the secondary coil. Herewith, the problem of a metallic object, such as a paper clip, being heated by eddy currents generated by the flux of the primary coil when such a metallic object is in the vicinity of the primary coil when the electronic device is absent is said to be solved. Now that cordless and cellular phones are becoming lighter and lighter, such phones would get weights comparable to metallic objects a person is carrying with him, such as a bunch of keys, or the like. Then, a spring constant of a spring counteracting the force exerted by the phone on the depressible member when the phone is put in the charging receptacle would have a value such that also relatively light metallic objects would depress the depressible member to such an extent that the flux would no longer be substantially located under the depressible member. Herewith, the danger of undesired heating of metallic objects is still present. Besides, the solution proposed in said European patent application is a complicated and vulnerable mechanical solution making the induction charging apparatus relatively expensive and difficult to manufacture.

OBJECT AND SUMMARY OF THE INVENTION

It is an object of the present invention to provide an induction charging apparatus of the above kind wherein said heating problem is effectively solved and the means to solve the heating problem are simple and cheap.

To this end the induction charging apparatus according to the present invention is characterized in that the induction charging apparatus comprises electric power blocking means for blocking power to be conveyed from the alternating current power source to the primary coil when the electronic device is absent from the charging receptacle, and the electronic device comprising unblocking means for unblocking the power to be conveyed, whereby the blocking and unblocking means are paired. The present invention is based upon the idea to totally block generation of a flux in the primary coil and upon the insight that by providing paired blocking and unblocking means an arbitrary metallic object would not easily meet the pairing criterion.

In an embodiment of an inductive charging apparatus according to the present invention, the blocking and unblocking means form a lock and key pair, whereby the key and the lock are located in respective ends of said casings that are in mechanical contact with each other when the electronic device is put in the receptacle. Herewith, it is guaranteed to a great extent that strange objects such as a bundle of keys activate the induction charging apparatus. The lock and key can be embodied as a kinematic inversion, i.e., the key can be put on the place of the lock, and vice versa.

In an embodiment of an inductive charging apparatus according to the present invention, the lock and key pair is mechanical, the key having a predetermined shape and the lock having a shape matching the shape of the key. Herewith, a very cheap and simple means is provided that can be easily manufactured in the moulding process for moulding the charger and the phone.

In an embodiment of an inductive charging apparatus according to the present invention, the lock and key pair is formed by a predetermined electric element and detection means for detecting the electric element. This is also a cheap and simple means which can be embodied as a small detection coil detecting a tag in said end of said second casing. Such a tag detector is known per se, e.g., for detecting stolen goods in shops, or the like.

In an embodiment of an inductive charging apparatus according to the present invention, the lock and key pair is formed by code transmitter and a code detector. Such a code transmitter and detector are known per se, e.g., in anti-theft systems for cars.

BRIEF DESCRIPTION OF THE DRAWING

The present invention will now be described, by way of example, with reference to the accompanying drawings, wherein FIG. 1 schematically shows an induction charging apparatus and an electronic device according to the present invention.

Throughout the figures the same reference numerals are used for the same features.

EDTAILED DESCRIPTION

Figure 1:
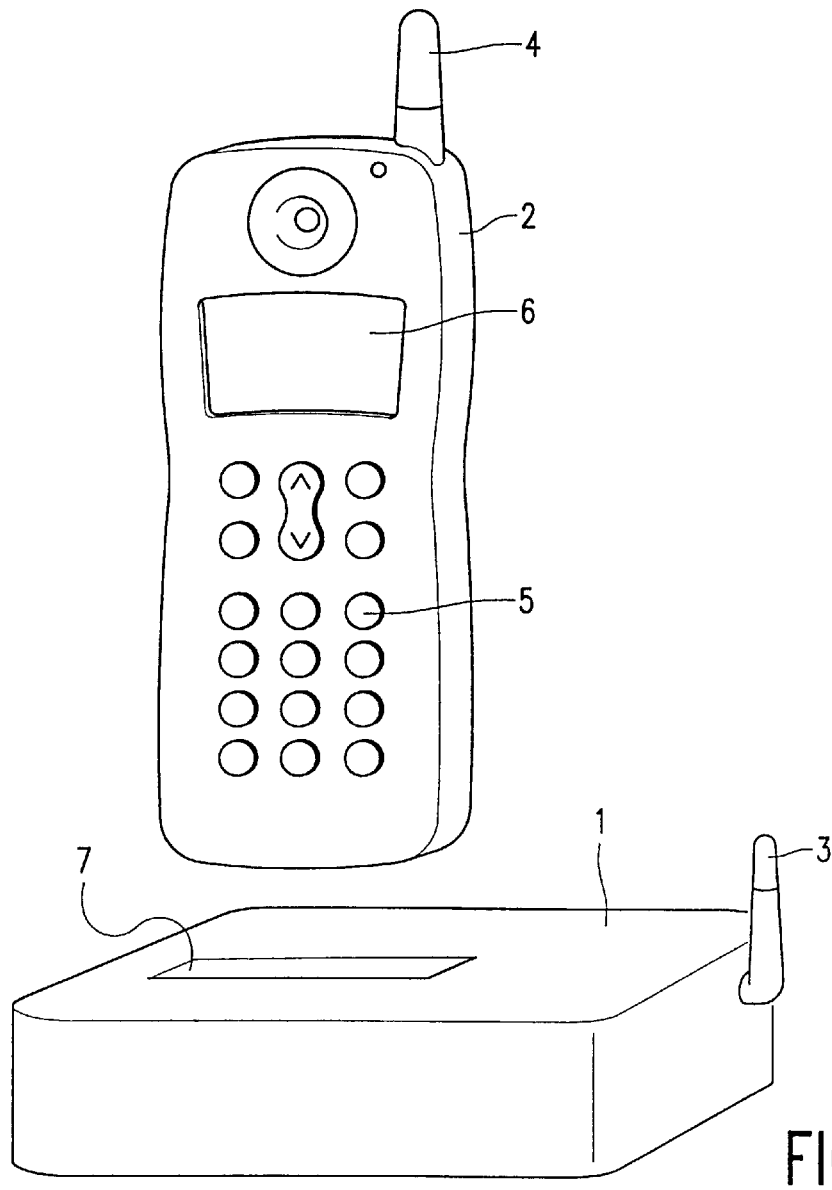

FIG. 1 schematically shows an induction charging apparatus 1 and an electronic device 2 according to the present invention. In the example given, the induction charging apparatus is comprised in a base station of a cordless telephone of which an antenna is shown and the electronic apparatus is the handset of the cordless phone. Shown are an antenna 4, a keyboard 5, and a display 6. Such cordless telephones are well-known in the art. The induction charging apparatus 1 comprises a charging receptacle 7 for charging batteries (not shown in detail) in the phone 2 when the phone is put in the receptacle 7.

Figure 2:
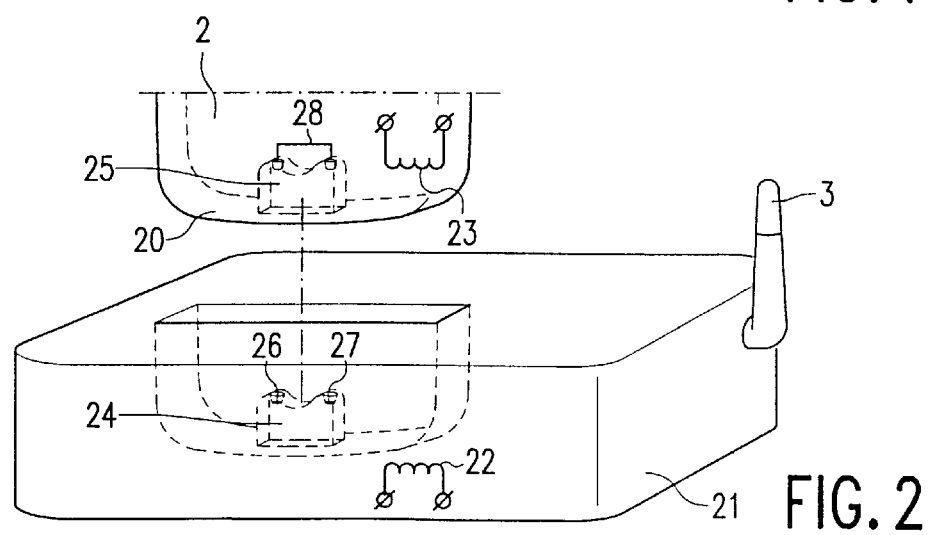
FIG. 2 shows a first embodiment of a lock and key pair according to the present invention.

FIG. 2 shows a first embodiment of a lock an key pair according to the present invention. Shown is a bottom wall 20 of the cordless phone's handset and a bottom wall 21 of the receptacle 7. Electrically, when the phone 2 is put in the receptacle 7, charging of the phone's batteries is done by inductively conveying energy from a primary coil 22 to a secondary coil 23. The operation of such an inductive charging principle is described in said European application. As a lock and key pair, a protrusion 24 is outwardly extending from the wall 21 of the receptacle 7 towards the wall 20 of the phone 20 so as to meet a recess 25 in the wall 20 of the phone 20 when put in the receptacle 7. The shape of the recess 25 is such that it matches the shape of the protrusion 24. The protrusion and recess can be made during the moulding process of the phone and the charger and do hardly contribute to the cost of these devices. The protrusion 24 is provided with contacts 26 and 27 which can be manufactured and integrated in the protrusion such that there is a small chance that a strange metallic object such as a paper clip or a bunch of keys would short-circuit these contacts. If the phone 2 is put in the receptacle 7, the protrusion 24 fits and matches the recess 25. The contacts 26 and 27 meet a conductive wire 28. Herewith, the contacts 26 and 27 and the wire 28 operate as a switch that is closed when the phone 2 is put in the receptacle 7, this switch unblocking the induction charging apparatus 1.

Figure 3:
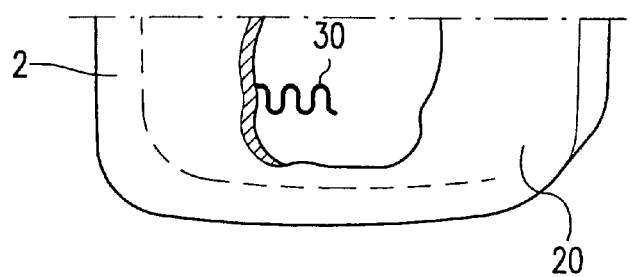
FIG. 3 shows a second embodiment of a lock and key pair according to the present invention.

FIG. 3 shows a second embodiment of a lock and key pair according to the present invention. Instead of an electromechanical solution as described with respect to FIG. 2, the present embodiment shows a pure electrical embodiment. A tag 30 in the form of a coil pattern of a thin metallic foil is put on the inner side of the wall 20 of the phone 2. Such a so-called radio tag is known per se for protecting goods against theft. For detecting the tag 30, the charging apparatus 1 comprises a radio tag detector (not shown in detail). When the phone 2 is put in the receptacle 2, the presence of the tag 30 is detected and a switch is activated to unblock the induction charging apparatus 1.

Figure 4:
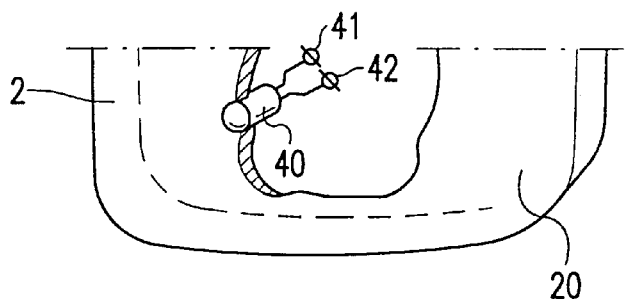
FIG. 4 shows a third embodiment of a lock and key pair according to the present invention.

FIG. 4 shows a third embodiment of a lock and key pair according to the present invention. Instead of a tag, a light emitting diode 40 is provided of which contacts 41 and 42 are coupled to a code transmitter (not shown in detail). When the phone 2 is put in the receptacle 7, the code is detected by a code detector (not shown in detail) and a switch is activated to unblock the induction charging apparatus 1.

Figure 5:
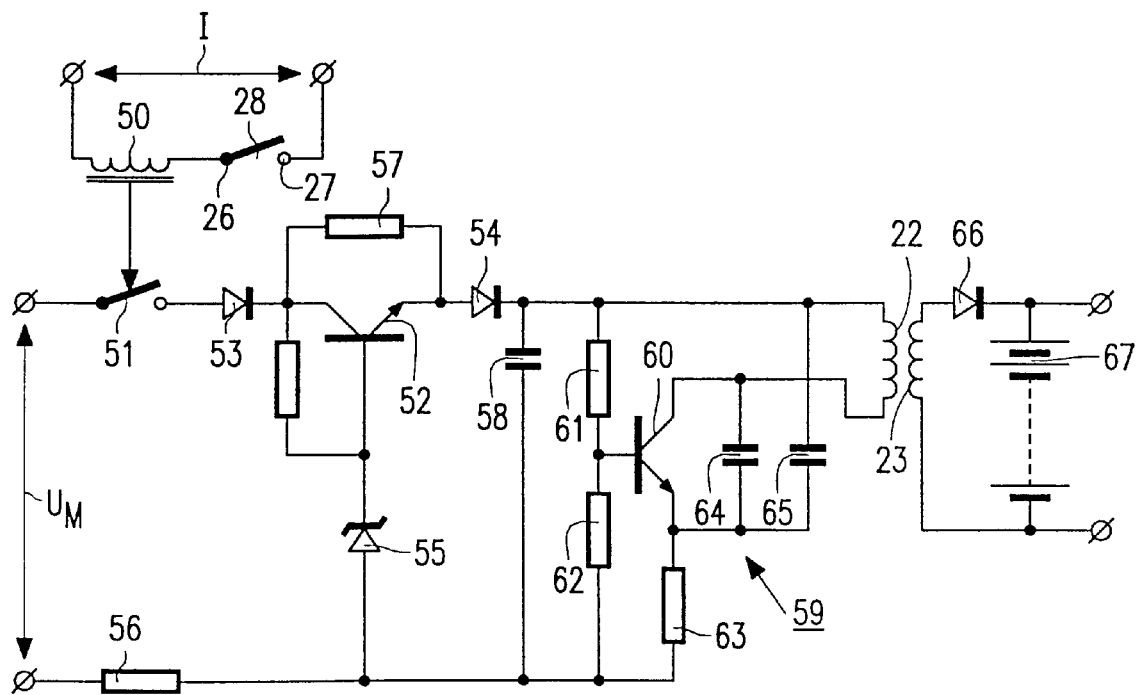
FIG. 5 shows an electronic diagram of blocking and unblocking of the charging apparatus according to the present invention.

FIG. 5 shows an electronic diagram of blocking and unblocking of the charging apparatus 1 according to the present invention. Shown is a relay coil 50 in series with the switch contact 28 which is closed when the phone 2 is put in the receptacle 7. The series arrangement of the coil 28 and the contact 28 are controlled by a DC current I to be generated in the induction charging apparatus 2. If the coil 50 is energised, its relay contact 51 closes and mains $U_M$ is supplied to the circuitry for energising the primary coil 22.

This circuitry is known per se, e.g., from said European patent application. The shown circuitry comprises a transistor 52 having its main electrodes coupled to a diode 53 and a diode 54, respectively, to one side of the mains and having its control electrode coupled to the other side of the mains via a Zener diode and resistor 56. A resistor 57 is coupled between the main electrodes of the transistor 52. With its other end the diode 54 is coupled to a capacitor 58 having its other end connected to a junction of the Zener diode 55 and the resistor 56. Across the capacitor 58 a DC-voltage is present that is so generated from the mains $U_M$. This DC voltage is fed to an oscillator 59 that operates as an inverter so as to generate a relatively high frequency signal across the primary coil 22. The oscillator 59 comprises a transistor 60 having its control electrode coupled to a junction of a series arrangement of resistors 61 and 62 that is coupled across the capacitor 58, and having its collector coupled to one side of the coil 22. The other side of the coil 22 is coupled to the diode 54. Further shown are a resistor 63 coupled between the emitter of the transistor 60 and the junction of the Zener 55 and the resistor 56, a capacitor 64 across the main electrodes of the transistor 60, and a capacitor 65 coupled between the emitter of the transistor 60 and the diode 54. The so generated AC-voltage is inductively coupled from the primary coil 22 in the induction charging device 1 to the secondary coil 23 of the phone 2. The AC voltage generated in the secondary coil 23 is rectified by means of a diode 66, and the rectified voltage is used to charge batteries 67 of the phone 2. The batteries 67 are used to power the phone 2 and can be replaced if needed.

I claim:

1. An induction charging device for charging a rechargeable battery means in an electronic device, said induction charging device comprising:

a first casing having a charging receptacle for receiving said electronic device, said electronic device having a second casing of an external shape at least partly matching an internal shape of said charging receptacle;

a primary coil for magnetic coupling to a secondary coil comprised in said electronic device so as to inductively convey energy for charging said rechargeable battery means;

an alternating current power source for coupling to said primary coil;

said charging receptacle comprising a first mechanical presence indication means of a first shape for cooperating with a second mechanical presence indication means of a second shape matching said first shape, said second mechanical presence indication means being a part of said second casing, said alternating current power source being de-coupled from said primary coil if said electronic device is not introduced into said charging receptacle, and said first mechanical presence indication means being arranged for controlling said alternating current power source to be coupled to said primary coil if said electronic device is introduced into said charging receptacle.

2. An induction charging device as claimed in claim 1, wherein said first mechanical presence indication means comprises a first electrical switching means, and said second mechanical presence indication means comprises a second electrical switching means matching said first electrical switching means, said second electrical switching means causing said first electrical switching means to couple said alternating current power source to said primary coil.

3. An induction charging device as claimed in claim 1, wherein said first mechanical presence indication means is a protrusion outwardly extending from a wall of said charging receptacle, and said second mechanical presence indication means is a recess an outer part of said second casing, said protrusion and said recess being located such that said protrusion and said recess engage when said electronic device is introduced into said charging receptacle.

4. An induction charging device as claimed in claim 1, wherein said second mechanical presence indication means is a protrusion outwardly extending from a wall of said charging receptacle, and said first mechanical presence indication means is a recess an outer part of said second casing, said protrusion and said recess being located such that said protrusion and said recess engage when said electronic device is introduced into said charging receptacle.

5. An electronic device comprising:

a rechargeable battery means;

a first casing of an external shape at least partly matching an internal shape of a charging receptacle comprised in a second casing of an induction charging device;

a first coil for magnetic coupling to a second coil comprised in said induction charging device so as to inductively convey power from said second coil to said first coil, said first coil being coupled to said rechargeable battery means, and said induction charging device comprising an alternating current power source for coupling to said second coil;

said first casing having a first mechanical presence indication means of a first shape for cooperating with a second mechanical presence indication means of a second shape matching said first shape, said second presence indication means being part of said second casing, said induction charging device comprising an alternating current source which is de-coupled from said second coil if said electronic device is not introduced into said charging receptacle, and said first mechanical presence indication means causing said second mechanical presence indication means for controlling said alternating current power source to be coupled to said first coil if said electronic device is introduced into said charging receptacle.

* * * * *